United States Patent
Brünner et al.

(10) Patent No.: US 11,023,182 B2
(45) Date of Patent: Jun. 1, 2021

(54) DOCUMENT PROCESSING SYSTEM FOR PROCESSING A PRINTJOB INCLUDING A PRODUCTION ROUTE SIMULATION

(71) Applicant: Océ Holding B.V., Venlo (NL)

(72) Inventors: Marvin P. Brünner, Venlo (NL); Jan H. Geels, Venlo (NL); Harmannus B. Roelfs, Venlo (NL); Daniel B. Blasiak, Montigny-le-Tilleul (BE)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/457,295

(22) Filed: Jun. 28, 2019

(65) Prior Publication Data

US 2020/0012461 A1  Jan. 9, 2020

(30) Foreign Application Priority Data

Jul. 4, 2018 (EP) .................................... 18181664

(51) Int. Cl.
  *G06F 3/12* (2006.01)
  *G06K 15/02* (2006.01)

(52) U.S. Cl.
  CPC .......... *G06F 3/1208* (2013.01); *G06F 3/1256* (2013.01); *G06F 3/1261* (2013.01);
  (Continued)

(58) Field of Classification Search
  None
  See application file for complete search history.

(56) References Cited

U.S. PATENT DOCUMENTS 9,207,887 B1   12/2015 Lahey et al.
9,639,306 B1 *  5/2017 Gupta ................... G06F 3/1205
(Continued)

FOREIGN PATENT DOCUMENTS

EP         2 116 929 A1    11/2009
WO   WO 2016050581 A1 *    4/2016

OTHER PUBLICATIONS

"JDF Specification"., CIP4 Organization, Release 1.5, 1268 pages, Dec. 31, 2013.
(Continued)

*Primary Examiner* — Haris Sabah
(74) *Attorney, Agent, or Firm* — Birch, Stewart, Kolasch & Birch LLP (57) ABSTRACT

A method for processing a print job on a document processing system including a plurality of devices which includes at least one printer and at least one finisher in order to deliver an end print product according to print specifications of the print job. Each device is described in a dedicated device model including constraints and capabilities of the device. The method includes receiving a print job with print specifications, generating a production route for the end product by selecting at least one printer and at least one finisher to deliver the end product, simulating the production route for the end product by executing the device models for the selected devices, generating finishing instructions for the at least one finisher, and processing the print job by printing the end product by the at least one printer and by finishing the end product by the at least one finisher according to the generated finishing instructions.

14 Claims, 4 Drawing Sheets

(52) U.S. Cl.
CPC .......... *G06F 3/1264* (2013.01); *G06F 3/1255* (2013.01); *G06F 3/1292* (2013.01); *G06K 15/025* (2013.01)

(56) References Cited

U.S. PATENT DOCUMENTS

| | | | |
|---|---|---|---|
| 10,324,665 B2* | 6/2019 | Van Horssen | G06F 3/125 |
| 2005/0286063 A1* | 12/2005 | Owen | G06F 3/1208 |
| | | | 358/1.13 |
| 2006/0192996 A1* | 8/2006 | Yamamoto | G06F 3/1256 |
| | | | 358/1.15 |
| 2009/0201534 A1* | 8/2009 | Truong | G06F 3/1284 |
| | | | 358/1.15 |
| 2011/0149315 A1* | 6/2011 | Yamazaki | H04N 1/0044 |
| | | | 358/1.9 |
| 2011/0242569 A1* | 10/2011 | Ohara | G06F 3/1232 |
| | | | 358/1.13 |
| 2014/0146339 A1* | 5/2014 | Rai | G06F 11/0733 |
| | | | 358/1.14 |
| 2017/0206041 A1 | 7/2017 | Van Horssen et al. | |
| 2017/0341375 A1 | 11/2017 | Menezes et al. | |

OTHER PUBLICATIONS

Search Report issued in European priority application 18181664, dated Sep. 24, 2018.

\* cited by examiner

For a same-up booklet:

Instruction for 3 sided trimming.

1. Place booklet with spine to the guide.
2. Set ruler to 147.8 mm.
3. Cut and Dispose (72.3 mm wide).
4. Rotate 90 degrees clockwise
5. Set ruler to 219.6 mm.
6. Cut and Dispose (6.4xxxxxxxxxxxx1 mm wide).
7. Set ruler to 114.8 mm.
8. Cut and Keep (104.8 mm wide).
9. Set ruler to 108.8 mm.
10. Cut and Dispose (6 mm wide).
11. Rotate 180 degrees.
12. Set ruler to 104.8 mm.
13. Cut and Dispose (4 mm wide).

DOCUMENT PROCESSING SYSTEM FOR PROCESSING A PRINTJOB INCLUDING A PRODUCTION ROUTE SIMULATION

FIELD OF THE INVENTION

The present invention relates to a method for processing a print job by a document processing system comprising a plurality of devices, the plurality of devices comprising at least one printer and at least one finisher which is an off-line finisher, a near-line finisher or an on-line finisher in order to deliver an end print product according to print specifications of the print job, each device of the plurality of devices being described in a dedicated device model comprising constraints and capabilities of said device.

The present invention further relates to a document processing system configured to execute the method according to the invention.

Constraints and capabilities of a device also comprise imposition schemes and information about input facilities and output facilities of the device.

The finisher according to the present invention is an off-line finisher, a near-line finisher or an on-line finisher. An in-line finisher is excluded from the present invention. Hereinafter where an off-line finisher is mentioned, also a near-line finisher or on-line finisher may be read.

BACKGROUND OF THE INVENTION

A document processing system is known to comprise at least one printer and at least one finisher. Printed sheets can be processed on the at least one finisher to produce a variety of end products like loose leaf documents, booklets, brochures, folders, perfect bound books, a stapled set of sheets, etc. Moreover, the sheets can be processed by one or more finishers before printing, for example pre-punching or pre-perforating.

Hereinafter finishing is understood to include finishing actions on finishers before printing and finishing actions on finishers after printing. Hereinafter finishing actions mentioned in any specification of finishing actions are to be envisioned, for example in a job definition format (JDF) specification.

Each device of the plurality of devices is described in a dedicated device model comprising constraints and capabilities of said device. US Patent Application 2017/0206041 reveals a method for defining device models according to actions to be executed by the device.

The variety in off-line/near-line/on-line finishers is large. Off-line/near-line/on-line finishers may provide only a single action like a guillotine trimmer or a series of actions like a perfect bound book maker. Off-line/on-line finishers may have different operating ranges and constraints. The number of finishing actions is finite like folding, cutting, trimming, stapling, punching, creasing etc. A finishing action is an operation on a sheet or on a stack of sheets or on an assembly of sheets like a book block with a cover glued around it. An example of an enumeration of finishing actions is given in "JDF specification", Release—1.5—Dec. 31, 2013.

An input of a device is defined as a resource which is suitable to put in the device for production of a document by the device. The input may for example be a number of loose sheets, a stack of loose sheets, a number of pre-processed sheets, a number of bound sheets like a booklet or a book, one or more cover sheets, etc. The input may be put in an input holder of the device.

An output of a device is defined as a deliverable which is output by the device. The output may for example be a number of loose printed sheets, a stack of loose printed sheets, a number of bound sheets like a booklet or a book, one or more cover sheets, a number of finished sheets like a number of trimmed sheets, a number of cut sheets, a number of perforated sheets, a number of laminated sheets, etc.

The printer and the finisher are production devices, but a human being like an operator or a robot like an operator is also capable of participating in a production route for an end product. Nowadays the finisher may be programmed in a separate step which leads to errors and additional work. Or, in case no instructions are given for the operator, wrong actions are executed that may lead to waste and reprints.

For example, cut and trim marks on printed output from a printer have the disadvantage that a guillotine needs to be visually set with the cut and trim marks. The cut and trim marks are then by definition cut off, hence less and less visual marks are left to align after each cut. Furthermore, a sequence of cutting is not explicit with these marks, while the sequence may make a difference for the end product quality. There is no robust solution to automate cutting via these marks.

It is an objective of the present invention to provide a method for processing a print job that needs finishing by the at least one finisher and to mitigate the operator problems mentioned here-above.

SUMMARY OF THE INVENTION

According to the present invention the objective is achieved by the method according to the invention wherein the method comprising the steps of receiving the print job at the document processing system with print specifications, generating a production route for the end product by selecting by means of the device models at least one printer and at least one finisher to deliver the end product, simulating the production route for the end product by executing the device models for the selected devices, generating directly from the simulation of the production route finishing instructions for the at least one finisher, and processing the print job by printing the end product by the at least one printer and by finishing the end product by the at least one finisher according to the generated finishing instructions.

According to an embodiment the finishing instructions comprise a first group of instructions for the operator to be executed manually by the operator at an intermediate product being output from the at least one printer and being input for the at least one finisher, and the method comprises the step of providing the first group of instructions to the operator to be executed manually on the intermediate product. According to another embodiment the first group of instructions also comprises instructions for the operator to be executed manually by the operator at the intermediate product being output from a first finisher and being input for a second finisher. According to another embodiment the first group of instructions also comprises instructions for the operator to be executed manually by the operator at a start product being input for the at least one printer.

According to an embodiment the method comprises the step of displaying the first group of instructions on a user interface screen of at least one out of the document processing system or a mobile device connected to the document processing system.

According to an embodiment the finishing instructions comprise a second group of instructions for the operator to be executed manually by the operator at the finisher, and the method comprises the step of providing the second group of instructions to the operator to be executed manually at the finisher.

According to an embodiment the method comprises the step of displaying the second group of instructions on a user interface screen of at least one out of the document processing system or a mobile device connected to the document processing system.

According to an embodiment the method comprises the step of displaying the second group of instructions on a user interface screen of the at least one finisher.

According to an embodiment the second group of instructions comprises alternately at least one instruction for manual processing of an intermediate product at the finisher and at least one instruction for input to a user interface screen of the finisher.

According to an embodiment the finisher is a near-line finisher and the finishing instructions comprise a third group of instructions for the near-line finisher to be set electronically in the near-line finisher, and the method comprises the steps of the near-line finisher receiving the third group of instructions to be set electronically via a network, and the near-line finisher setting the third group of instructions electronically.

According to an embodiment the finisher is an on-line finisher and the finishing instructions comprise a fourth group of instructions for the on-line finisher to be set electronically or mechanically in the on-line finisher, and the method comprises the steps of the on-line finisher receiving the fourth group of instructions to be set before printing on the at least one printer, and the on-line finisher setting the fourth group of instructions electronically or mechanically.

According to an embodiment the step of generating directly from the simulation of the production route finishing instructions for the at least one finisher comprises generating finisher set up instructions for the finisher. The generated finisher set up instructions may be executed by the operator or electronically before the actual start of the print job, for example before printing of sheets by the at least one printer.

According to an embodiment the device model of the finisher comprises a dedicated positioning system for sheets to be finished and the first group of instructions comprises orientation actions for the operator to orientate the intermediate product before input of the intermediate product in the finisher.

The present invention also relates to a document processing system for processing a print job, the document processing system comprising a plurality of devices, the plurality of devices comprising at least one printer and at least one finisher which is an off-line finisher or a near-line finisher in order to deliver an end print product according to print specifications, the document processing system comprising a device modeler configured to describe each device of the document processing system in a dedicated device model comprising constraints and capabilities of said device, wherein the at least one printer comprises at least one print engine which is configured to process the print job by printing sheets for the end product, and wherein the device modeler is configured to receive the print job at the document processing system with print specifications, generate a production route for the end product by selecting by means of the device models the at least one printer and the at least one finisher to deliver the end product, simulate the production route for the end product by executing the device models for the selected devices, and generate directly from the simulation of the production route finishing instructions for the at least one finisher.

The present invention also relates to a non-transitory software medium comprising executable program code configured to, when executed, perform the method according to the invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE EMBODIMENTS

The present invention will now be described with reference to the accompanying drawings, wherein the same or similar elements are identified with the same reference numerals throughout the several views.

Figure 1:
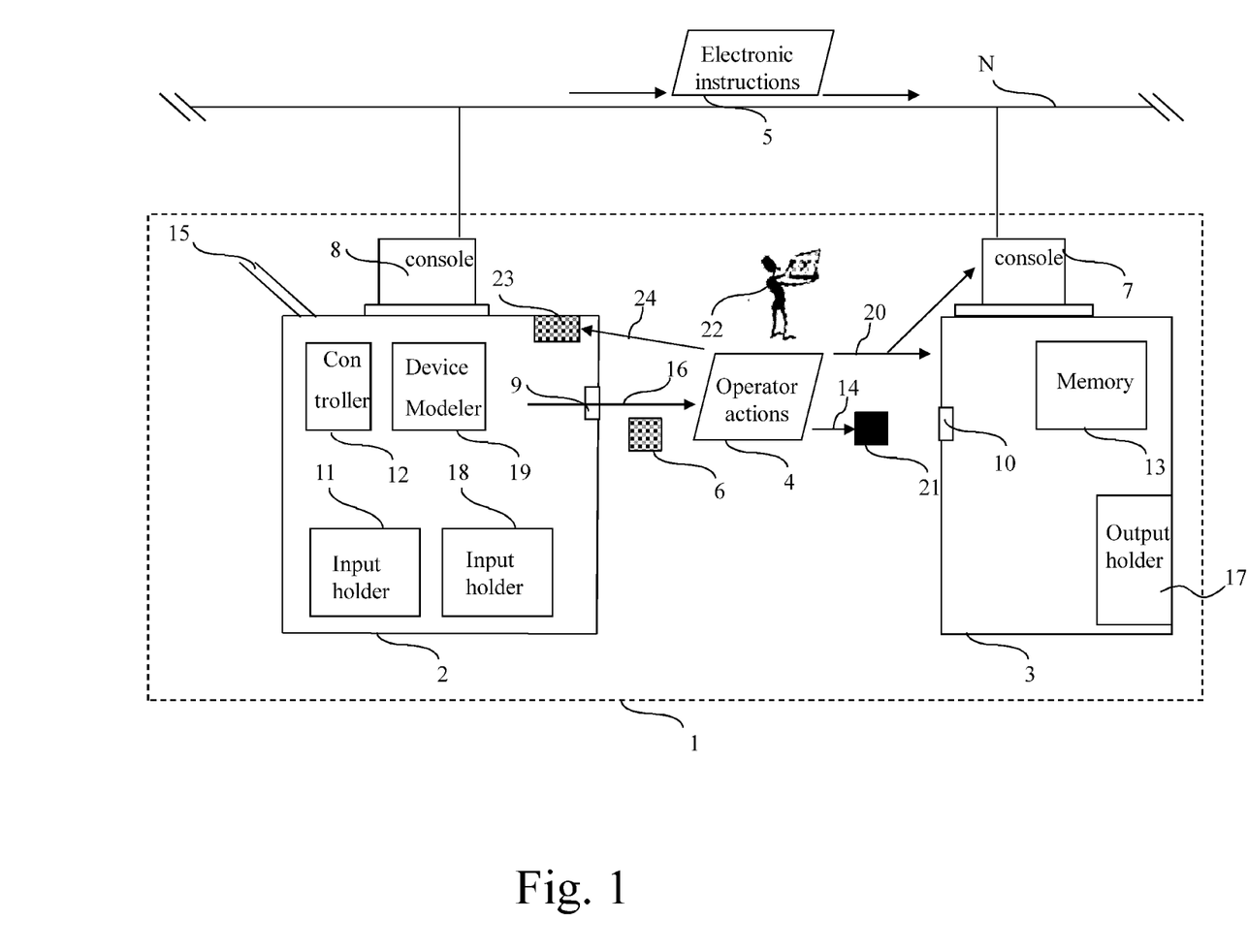
FIG. 1 shows a schematic view of a document processing system according to the present invention.

FIG. 1 is a schematic view of an embodiment of the document processing system 1 according to the invention. The view is showing the document processing system 1 comprising a printer 2, connected to a network N, a finisher 3 which is optionally connected to the network N, a finishing module console 7, a print module console 8, a sheet outlet 9, a sheet inlet 10, a print controller 12 in the printer 2, a finisher memory 13 in the finisher 3, an optional automatic document feeder 15 on the printer 2 for feeding sheets of a physical start product to the printer 2, at least one input holder 11, 18 for holding the physical start product like a stack of sheets and an output holder 17 on the finisher 3 for receiving and holding output of a plurality of sheets, for example a stack of printed and finished sheets.

The document processing system 1 comprises one printer 2 and one finisher 3, but more than one printer and/or more than one finisher may be envisioned in the document processing system 1.

The following table introduces definitions for in-line finishers, on-line finishers, off-line finishers and near-line finishers.

| Integrated into the printing production route? | Settings Flow | |
| --- | --- | --- |
| | YES | NO |
| Paper flow YES | IN-line | ON-line |
| NO | NEAR-line | OFF-line |

The in-line devices are part of the printing device and are not concerned in the present invention. The off-line devices and near-line device are not part of the printing device but are concerned in the present invention. The finisher 3 in FIG.

1 is an example of an off-line or near-line finisher. The on-line devices are part of the printing device and are also concerned in the present invention. The corresponding device models which are created for the off-line, near-line and on-line devices according to the present invention, reflect aspects of off-line, near-line and on-line finishing devices and input and output facilities of the finishing devices.

The document processing system 1 is configured to deliver at least one end print product according to specifications of the print job received via the network N by the document processing system 1. The document processing system 1 may find multiple options for producing the at least one end product. A preferred option will be shown as smart default production parameter values and/or in a work in progress preview and in end-result previews on the print module console 8 or even on the finishing module console 7. The preferred option shown may be called print job specifications or print specifications and determine a production route to be executed. An operator 22 may change or fix some device parameters to another value. Such a change or fix will result in a new simulation via the device models where the available options are constraint by the user selection of the operator 22. The preferred option while taking the fixed values into account is shown, e.g. result in new print job specifications.

The printer 2 may have a print interface (not shown) and the finisher 3 may have a finishing interface (not shown) in order to electronically exchange digital information about printing and finishing instructions, which printing and finishing instructions are needed for processing the print job in order to lead to the desired end product. The print interface and finishing interface may exchange data via the network N. At least one printed sheet 6 arrives at the sheet outlet 9 in order to be captured 16 by the operator 22—a human being or robot. The operator 22 may carry out operator actions 4 on the at least one printed sheet leading to a modified at least one printed sheet 21. The operator 22 guides 14 the modified at least one printed sheet 21 to the sheet inlet 10 of the finisher 3. The sheet inlet 10 may also be configured for input of a stack of sheets.

Pre-printing instructions, printing instructions and finishing instructions may be part of specifications of the print job. Printing and finishing instructions may also be entered via the printer user interface console 8 and stored in the controller 12 of the printer 2.

Finishing instructions may also be entered via a finisher user interface 7 and stored in the finisher memory 13 of the finisher 3.

Finishing instructions may be in a form of step-by-step actions to be executed by the operator 22, which may be a displayed or printed instruction page, instructions on a printed sheet, instructions displayed on a tablet, etc.

Each device of the document processing system 1 is described in a dedicated device model comprising constraints and capabilities of the device. The dedicated device models may be stored in the controller 12 of the printer 2, but may also be stored in a remote control station like a computer connected to the network N. Based on the constraints and capabilities derived from the device models residing in the controller 12 the document processing system is configured to construct a production route for the end product as will be explained hereinafter.

The document processing system 1 comprises a device modeler 19. The device modeler 19 is shown in FIG. 1 inside the printer 2, but may be installed on a remote control station connected to the printer 1 and/or finisher 3 via the network N. The device modeler 19 is configured to describe each device of the document processing system 1—the printer 2, the finisher 3, and an on-line finisher 23—in a dedicated device model comprising constraints and capabilities of said device, The printer 2 comprises at least one print engine (not shown) which is configured to process a print job by printing sheets for the end product. When the print controller 12 receives the print job with print specifications for the end product, the print job is transferred to the device modeler 19.

The device modeler 19 generates a production route for the end product by selecting by means of the device models the printer 2, the finisher 3 and the on-line finisher 23 to deliver the end product. The device modeler 19 is capable of simulating the production route for the end product by executing the device models for the selected devices 2, 3, and generates directly from the simulation of the production route finishing instructions 4, 5 for the finisher 3 and the on-line finisher 23.

The generated finishing instructions 4, 5 comprise a first group of instructions 14 for the operator to be executed manually by the operator 22 at the intermediate product 6 being output from the printer 2 and being input for the finisher 3. The first group of instructions is provided to the operator 22 to be executed manually on the intermediate product 6 by means of at least one of the consoles 7, 8 or via a remote control station connected to the network N.

The generated finishing instructions 4, 5 may comprise a second group of instructions 20 for the operator to be executed manually by the operator 22 at the finisher 3. The second group of instructions 20 is provided to the operator 22 to be executed manually. The operator 22 may enter instructions via the console 7 of the finisher 3 or may set hardware being part of the finisher 3. The second group of instructions 20 may be displayed at any of the consoles 7, 8 of the document processing system 1 or via a remote control station connected to the network N.

According to an embodiment the second group of instructions comprises alternately at least one instruction for manual processing of an intermediate product 6 at the finisher 3 and at least one instruction for input to the console 7 of the finisher 3.

The generated finishing instructions 4, 5 may comprise a third group of instructions 5 for the finisher 3 to be set electronically in the finisher 3 without operator intervention. The finisher 3 receives the third group of instructions to be set electronically via the network N. The finisher 3 sets the third group of instructions electronically for example by means of digital parameter values suitable for an appropriate finishing by the finisher 3 to achieve the specified end product.

The generated finishing instructions 4 may comprise a fourth group of instructions 24 for the on-line finisher 23 to be set electronically or mechanically, automatically or by operator intervention in the on-line finisher 23. The on-line finisher 23 is part of the printer 2 and may receive the fourth group of instructions 24 to be set electronically or mechanically by the operator 22. The on-line finisher 23 sets the fourth group of instructions 24 electronically or mechanically before actual printing by the printer 2 has started, for example by means of digital parameter values suitable for an appropriate finishing by the on-line finisher 23 to achieve the specified end product, i.e. the specified print product resulting from the printer 2.

The controller 12 may comprise the device modeller 19 according to the invention. The device modeller may be at least part of a software application residing in memory of the controller 12 or may be implemented in one or more hardware units, or may be implemented as a combination of hardware and software in the controller 12.

In an embodiment the device modeller is part of a software or hardware application residing on at least one computer in the network N coupled to the printer 2 and/or the finisher 3. Device models may also be distributed among a plurality of computers in the network N. In this particular embodiment the at least one computer in the network is part of the document processing system 1. The network may expand into a cloud system or into an intranet or into the internet. The printer user interface console 8 may be used to display the production route according to the invention. However, the production route may also be displayed on a user interface comprised in the at least one computer in the network N. A mix of displaying a part of the production route on the printer console 8 and another part of the production route on the finisher console 7 may be envisioned.

The finisher 3 may be a trimming device, a cutting device, a punching device, a folding device, a laminating device, a book binder or any other finishing device, or a device which combines before-mentioned finishing devices and/or their actions. It is also in the scope of the invention that the document processing system 1 comprises a plurality of finishers which is concatenated to a sequence or network of finishers positioned to allow sequential and/or parallel finishing. The plurality of finishers is used after a printing process on the printer 2. It is also in the scope of the invention that the document processing system 1 comprises a plurality of printers which is concatenated or positioned to allow sequential and/or parallel processing of the print job.

The at least one printer and the at least one finisher according to the invention are available for use during the production of the end print product according to the invention. Essential is that the finishing instructions 4, 5 are derived directly from the simulation executed by the device modeller 19.

According to another embodiment the finishing instructions are expressed in text form by printing the finishing instructions on a sheet by means of an available printer in the network N. The finishing instructions may contain text, drawings, animations or a machine readable set of instructions to be executed automatically by the off-line finisher 3.

A device model in the device modeller 19 is modelled by means of actions for the device. From the modelled actions the finishing instructions are directly generated.

According to an embodiment the generated finishing instructions are used to visualize on the local consoles 7, 8 incoming and outgoing stacks of sheets and—by doing so—create a very visual method of the actions to be performed. From a number of cuts and stack rotations a processing duration of the finishing may be estimated.

The device model of the finisher 3 may comprise a dedicated positioning system for sheets to be finished and the first group of instructions 14 comprises orientation actions for the operator 22 to orientate the intermediate product 6 before input of the orientated intermediate product 21 in the finisher 3. For example, the finisher 3 may perform his finishing action towards a guide, ruler or fixed part of the finisher 3. A stitcher may stitch at the trailing edge of a paper. Often this trailing edge is not the edge of the paper that is regarded as the binding edge in the final document. The binding edge of the final document is determined by the operator 22 reading the document. When taking out the stack of stitched sheets, the operator 22 orientates the stack in such a way that the stitches are at the desired location. The device modeler 19 records the action to be performed and the exact location in its own coordinate system. The recorded information is available for subsequent actions in coordinate systems of subsequent finishing devices, such as a human who may orientate the stack in such a way that the finishing action results are at the desired location. The orientation action may be a move, a rotation or a flip over of a sheet or a stack of sheets.

Figure 2:
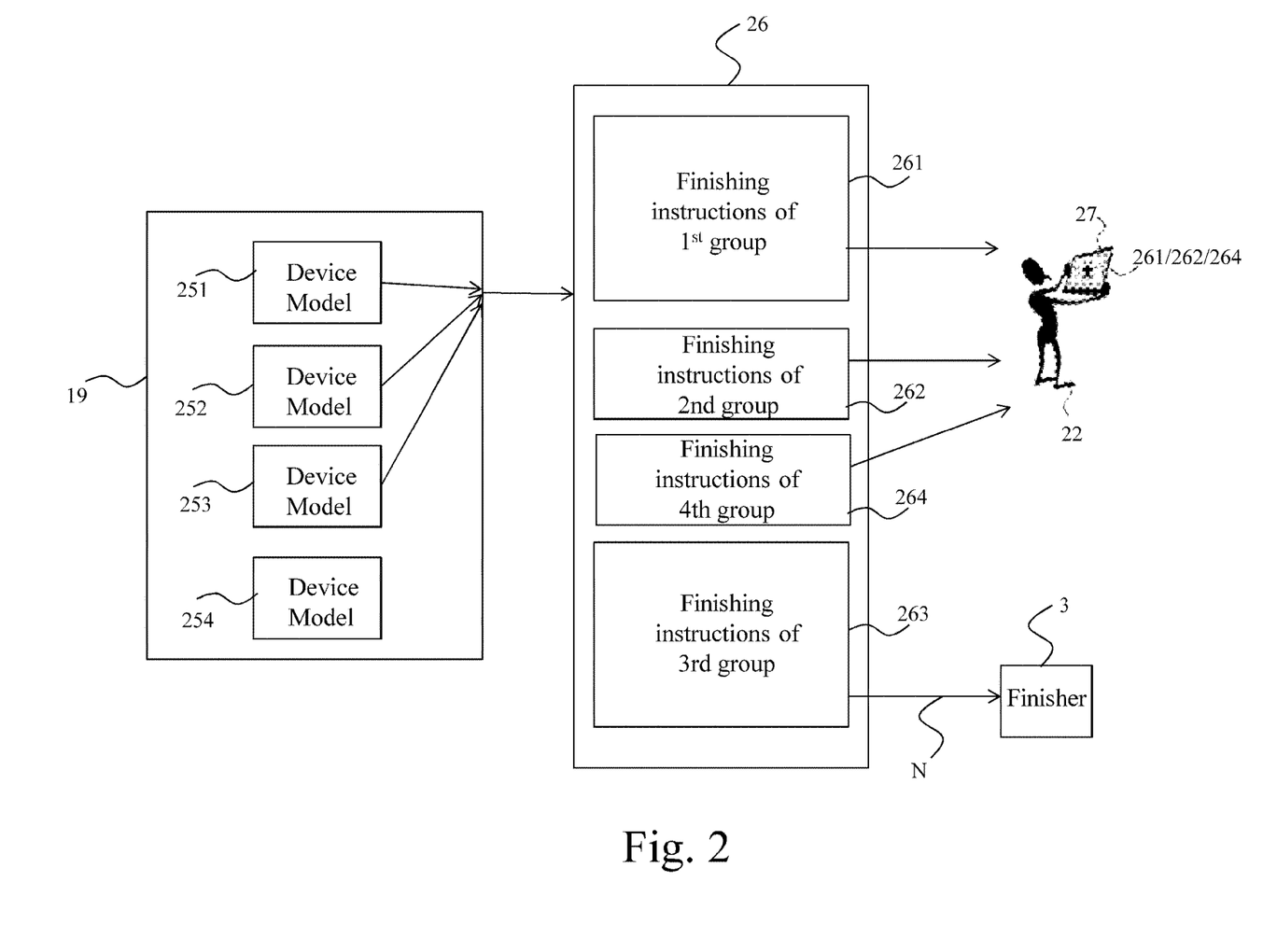
FIG. 2 is a diagram of a flow of finishing instructions according to the invention.

FIG. 2 shows a diagram of a flow of finishing instructions 26 according to the invention. The device modeller 19 comprises device models 251-254 of a number of devices such as a device model 251 for the printer 2, a device model 252 for the finisher 3 and a device model 253 for the on-line finisher 23. The device models are used to construct the production route. Once the production route has been established, the production route is simulated by executing the device models 251-254 and thus delivering the finishing instructions 26. In this example in FIG. 2 the finishing instructions 26 comprise the first group 261 of finishing instructions according to the invention, the second group 262 of finishing instructions according to the invention, the third group 263 of finishing instructions according to the invention, and the fourth group 264 of finishing instructions according to the invention.

The finishing instructions of the first group 261, the second group 262 and the fourth group 264 are displayed on the console 6 or 7 being shown in FIG. 1, or sent to a mobile device 27 of the operator 22 via a wireless connection to the network N and displayed on the mobile device 27, or submitted to an available printer in the network N to print the finishing instructions 261, 262, 264 on a sheet for the operator 22.

The finishing instructions of the third group 263 are directly sent to the finisher 3 via the network N.

The finishing instructions of the fourth group 264 are meant for the operator to process the on-line finisher 23 before printing takes place.

Figure 3:
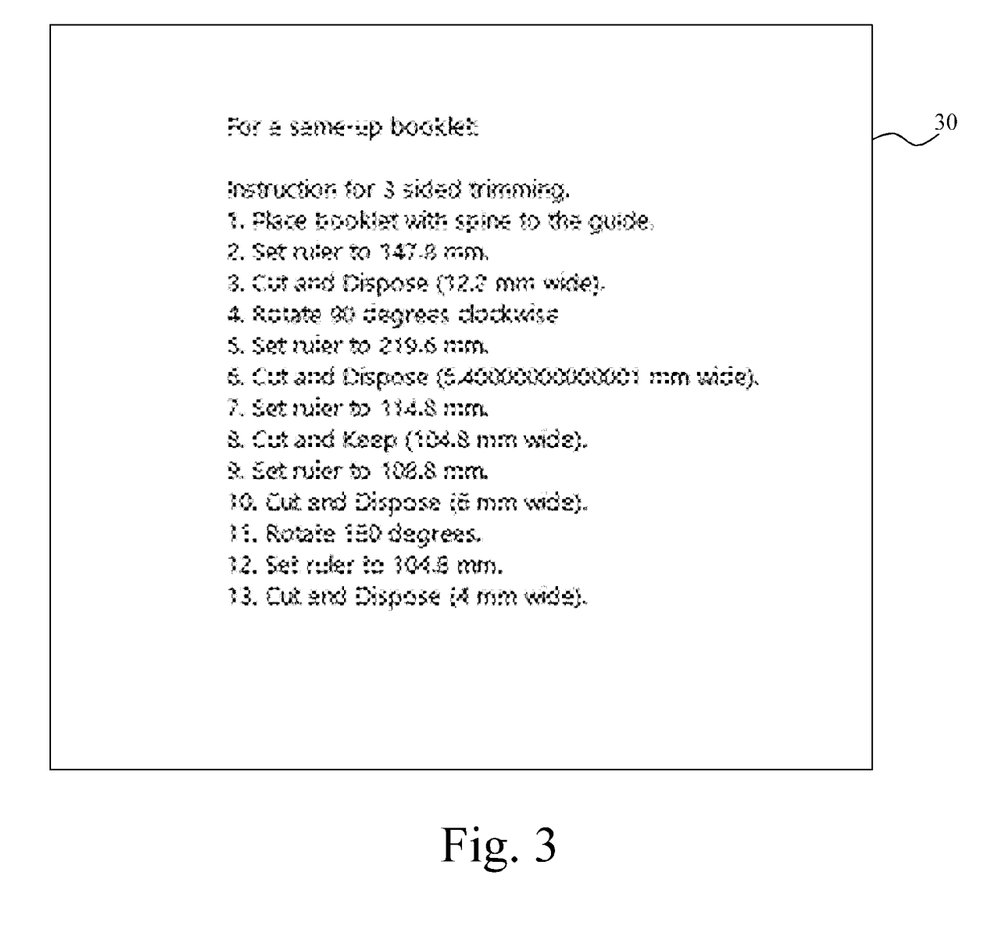
FIG. 3 shows an example of finishing instructions for the operator according to the invention.
Figure 4:
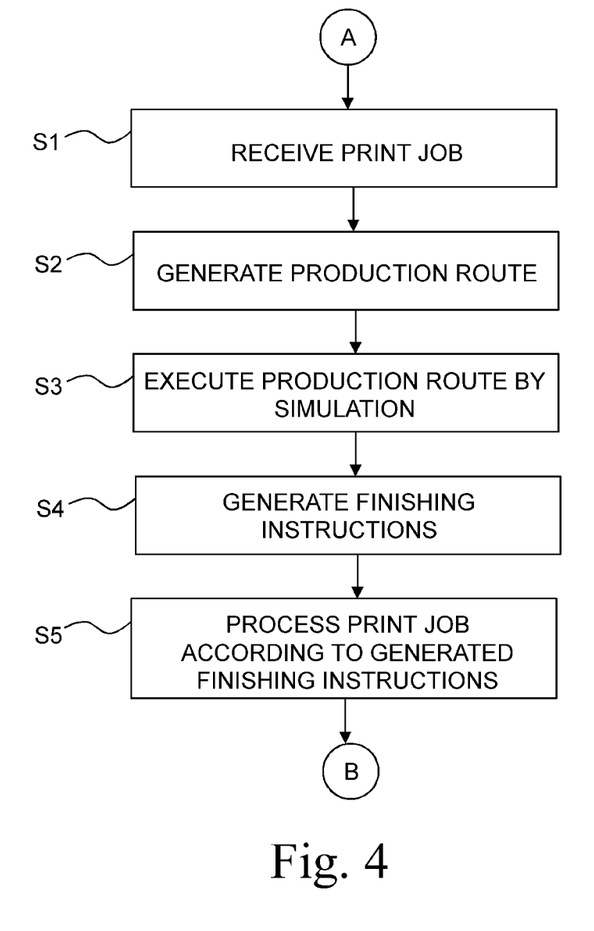
FIG. 4 shows a first embodiment of the method according to the present invention.

FIG. 3 shows an example of finishing instructions 30 of the second group 262 for the operator 22. The finishing instructions 30 concern a trimming procedure for a booklet from a same-up booklet that is still untrimmed by a trimmer. The finishing instructions in FIG. 3 are human readable text, but may also be accompanied with drawings, bar codes referring to further instructions, etc. The second group 262 of instructions may be considered as an example of instructions that comprise alternately at least one instruction for manual processing of an intermediate product at the trimmer and at least one instruction for input to a console of the trimmer. FIG. 4 is a flow diagram of the method according to the invention.

The method starts in a start point A which leads to a first step S1.

In the first step S1 a print job is received at the document processing system with print specifications for the end product.

In a second step S2 a production route is generated for the end product by selecting by means of the device models at least one printer and at least one finisher to deliver the end product.

In a third step S3 the production route is simulated for the end product by executing the device models for the selected devices.

In a fourth step S4 finishing instructions for the at least one finisher are generated directly from the simulation of the production route. The finishing instructions may comprise the first group, the second group, the third group and the fourth group of instructions according to the present invention. According to an embodiment the second group of instructions comprises alternately at least one instruction for manual processing of an intermediate product at the finisher and at least one instruction for input to the console of the finisher.

In a fifth step S5 the print job is processed by printing the end product by the at least one printer and by finishing the end product by the at least one finisher according to the generated finishing instructions.

The method ends in an end point B.

The skilled person will recognise that other embodiments are possible within the scope of the appended claims.

The invention claimed is:

1. A method for processing a print job by a document processing system comprising a plurality of devices, the plurality of devices comprising at least one printer and at least one finisher which is an off-line finisher or a near-line finisher in order to deliver an end print product according to print specifications of the print job, each device of the plurality of devices being described in a dedicated device model comprising constraints and capabilities of said device, the method comprising the steps of:
receiving the print job at the document processing system with the print specifications;
automatically generating a production route for the end product by selecting by means of the device models the at least one printer and the at least one finisher to deliver the end product;
simulating the production route for the end product by executing the device models for the selected at least one printer and at least one finisher;
generating directly from the simulation of the production route finishing instructions for an operator of the at least one finisher; and
processing the print job by printing the end product by the at least one printer and by finishing the end product by the at least one finisher according to the generated finishing instructions,
wherein after the step of generating the finishing instructions and before the step of processing the print job, the method further comprise the steps of:
receiving changed or fixed device parameter values of at least one of the plurality of devices entered by the operator;
re-simulating the production route via the device models wherein available options are constraint by the changes and fixes of the device parameter values; and
re-generating directly from the re-simulations of the production route finishing instructions for the operator of the at least one finisher, said re-generated finishing instructions resulting in new print job specifications.

2. The method according to claim 1, wherein the finishing instructions comprise a first group of instructions for the operator to be executed manually by the operator at an intermediate product being output from the at least one printer and being input for the at least one finisher, and the method comprises the step of providing the first group of instructions to the operator to be executed manually on the intermediate product.

3. The method according to claim 2, wherein the method comprises the step of displaying the first group of instructions on a user interface screen of at least one out of the document processing system or a mobile device connected to the document processing system.

4. The method according to claim 1, wherein the finishing instructions comprise a second group of instructions for the operator to be executed manually by the operator at the finisher, and the method comprises the step of providing the second group of instructions to the operator to be executed manually at the finisher.

5. The method according to claim 4, wherein the method comprises the step of displaying the second group of instructions on a user interface screen of at least one out of the document processing system or a mobile device connected to the document processing system.

6. The method according to claim 5, wherein the finisher is the near-line finisher and the method comprises the step of displaying the second group of instructions on a user interface screen of the finisher.

7. The method according to claim 4, wherein the second group of instructions comprises alternately at least one instruction for manual processing of an intermediate product at the finisher and at least one instruction for input to a user interface screen of the finisher.

8. The method according to claim 1, wherein the finisher is the near-line finisher and the finishing instructions comprise a third group of instructions for the near-line finisher to be set electronically in the near-line finisher, and the method comprises the steps of the near-line finisher receiving the third group of instructions to be set electronically via a network, and the near-line finisher setting the third group of instructions electronically.

9. The method according to claim 1, wherein the step of generating directly from the simulation of the production route finishing instructions for the at least one finisher comprises generating finisher set up instructions for the finisher.

10. The method according to claim 2, wherein the device model of the finisher comprises a dedicated positioning system for sheets to be finished and the first group of instructions comprises orientation actions for the operator to orientate the intermediate product before input of the intermediate product in the finisher.

11. A non-transitory computer readable medium comprising executable program code configured to, when executed, perform the method according to claim 1.

12. The method according to claim 1, wherein the device model of the at least one finisher records an action to be performed and an exact location in an own coordinate system of the finishing device.

13. The method according to claim 12, wherein the recorded action and the exact location is available for subsequent actions in coordinate systems of subsequent finishing devices.

14. A document processing system for processing a print job, the document processing system comprising:
a plurality of devices, the plurality of devices comprising at least one printer and at least one finisher which is an off-line finisher or a near-line finisher in order to deliver an end print product according to print specifications; and
a device modeler configured to describe each device of the document processing system in a dedicated device model comprising constraints and capabilities of said device,
wherein the at least one printer comprises at least one print engine which is configured to process the print job by printing sheets for the end product,
wherein the device modeler is configured to:
receive the print job at the document processing system with the print specifications;

automatically generate a production route for the end product by selecting by means of the device models the at least one printer and the at least one finisher to deliver the end product;

simulate the production route for the end product by executing the device models for the selected at least one printer and at least one finisher; and generate directly from the simulation of the production route finishing instructions for an operator of the at least one finisher, and wherein the device modeler is further configured to, after generating the finishing instructions and before processing the print job:

receive changed or fixed device parameter values of at least one of the plurality of devices entered by the operator;

re-simulate the production route via the device models wherein available options are constraint by the changes and fixes of the device parameter values; and re-generate directly from the re-simulations of the production route finishing instructions for the operator of the at least one finisher, said re-generated finishing instructions resulting in new print job specifications.

\* \* \* \* \*